United States Patent [19]
Schneider

[11] 3,993,517
[45] Nov. 23, 1976

[54] THIN CELL ELECTROMEMBRANE SEPARATOR

[75] Inventor: Burnett M. Schneider, Wind Lake, Wis.

[73] Assignee: The United States of America as represented by the Secretary of the Interior, Washington, D.C.

[22] Filed: Oct. 31, 1975

[21] Appl. No.: 627,810

[52] U.S. Cl. .................................. 156/13; 156/18; 156/250; 156/277; 264/251; 264/252; 264/254; 427/282; 428/195; 428/269; 210/23 H
[51] Int. Cl.² ...................... B01D 13/04; C08J 5/18
[58] Field of Search ............... 156/11, 18, 154, 245, 156/246, 247, 277, 285, 267, 250, 13; 427/282; 264/251, 252, 254; 428/186, 254, 269, 195; 210/23 H; 96/36.4

[56] References Cited
UNITED STATES PATENTS

| | | | |
|---|---|---|---|
| 3,156,563 | 11/1964 | Harrison et al. | 156/11 |
| 3,351,689 | 11/1967 | Bushcott et al. | 264/254 |
| 3,520,803 | 7/1970 | Iaconelli | 210/23 H |
| 3,580,841 | 5/1971 | Cadotte et al. | 210/23 H |
| 3,657,115 | 4/1972 | Manjikean et al. | 210/23 H |
| 3,876,449 | 4/1975 | Smith et al. | 427/282 |

Primary Examiner—William A. Powell
Assistant Examiner—Jerome W. Massie
Attorney, Agent, or Firm—William S. Brown; Donald R. Fraser

[57] ABSTRACT

A method is provided for fabricating separators, particularly thin cell electro-membrane separators used in electrodialysis stacks for the desalination of water. The method includes placing a master stencil or mask on top of a plastic mesh which is laid out on a rigid backing sheet and pouring massive amounts of a curable polymer such as silicone rubber through the hole pattern formed in the stencil. The polymer is then spread out to fill the pattern, the stencil removed and a cover sheet applied. The polymer is then pressed into the pores of the mesh using a roller applied against the cover sheet. The sandwich of the mesh and cover and backing sheets is placed into a pile between metallic sheets, and the pile is compressed during the curing of the polymer. The cover and backing sheets are then scupped off and the polymer impregnated mesh die cut to produce the required edge shape and flow holes.

11 Claims, 3 Drawing Figures

THIN CELL ELECTROMEMBRANE SEPARATOR

FIELD OF THE INVENTION

The present invention relates to a method for fabricating separators and, in particular, to a method for fabricating thin cell electro-membrane separators used in electrodialysis, transport depletion and other related electrochemical operations for the desalination of seawater, desalination of brackish water, brine concentration and other ion modification operations.

BACKGROUND OF THE INVENTION

Electrodialysis modules are of interest, inter alia, as components in electrodialysis stack systems for the desalination of water. The separators are positioned between an ion and cation exchange membranes in a stacked sheet arrangement and are designed to direct the orderly flow of ion-containing solutions through the stack. Because the efficiency of the stack is reduced by increased thickness of the separators, separator thickness is preferably minimized. Specifically, thin cell separators (viz., separators having thicknesses approximately 0.5 mm) are more efficient than "thick" cell separators (viz., those having thicknesses of 1.3 mm) because, among other reasons, the electrochemical resistance of the separator to current flow is reduced, the polarization effects in electrodialysis stacks can be decreased, and the thin cells are generally more economical to manufacture than thick cells.

Such thin cell separators should function in the manner of a gasket to seal the flow paths between membranes and prevent leakage of solution either between compartments within the stack or between the stack and the outside thereof. The gasket portions of the separators thus should be sufficiently resilient to conform to the irregular or rough surfaces of some types of commercial membranes and thereby form a liquid-tight seal. In addition, the separator should provide for distributing the solution into the membranes. On the other hand, because it is desirable to utilize a maximum area of the electrodialysis membranes in the desalination process, the obstruction to solution flow presented by the separator should be a minimum and hence the solution distributing and the gasket portions of the separator should cover a minimum of the total separator area.

A successful embodiment of such a thin cell separator comprises a plastic flow through mesh and an associated gasket which extends around the periphery of the mesh and is fabricated from a suitable polymer such as silicone rubber. One technique for constructing thin cell separators of this type includes filling the pores of the plastic mesh with a curable plastic by hand-squeezing a polymer material such as silicone rubber from a tube onto the plastic mesh in the desired configuration for the gasket. The mesh is then placed between polyethylene sheets and, through the use of a roller, the rubber is pressed down into a thickness approximately equal to that of the mesh. After curing, the holes and the outside edges of the separator are cut using a template, and the inside edges of the gasket "picked" to form a smooth edge. The drawback with this method is that while it produces quality separators, the time and labor required render the method impractical for commercial use.

Other methods such as injection molding and compression molding have also been used, but these suffer disadvantages such as the complexity, and hence expense, of the mold required, and difficulties regarding the maintenance of proper gasket thicknesses.

As explained in detail hereinafter, the present invention concerns a screen printing technique for forming separators. So-called "silk screening" itself is, of course, an extremely common, well known process. Further, British Pat. No. 1,212,839 concerns the use of screen printing in producing face-to-face seals or gaskets wherein a polymer is forced through a temporary screen into a pattern in a relatively thick stencil, the screen being removed after the gasket is formed. As will become clear from the discussion below, the method of the invention is quite different from that disclosed in the British patent. Other patents of possible interest include U.S. Pat. Nos. 2,460,168 (Caserta) 3,580,841 (Cadotte et al) and 3,696,742 (Parts et al.) although this listing is not, nor is it intended to be, exhaustive.

SUMMARY OF THE INVENTION

In accordance with the invention, a method is provided for producing flow directing separators which overcomes the problems associated with the techniques discussed above that are used for the same purpose. Although the method of the invention is specifically concerned with thin cell separators for use in electrodialysis modules for water desalination, the same method can be applied to other equipment using stacked cells such as filter presses, and fuel cells. The method of the invention provides substantial advantages over the techniques discussed hereinbefore particularly in the area of cost. The method of the invention represents an economical and practical way to produce thin cell separators and, in addition, produces finished separators which are generally more efficient in operation than those produced by other methods.

Generally speaking, according to a preferred embodiment thereof, the method of invention comprises laying out a sheet of plastic mesh (such as Dupont's "Vexar") on a working surface, placing a master mask or stencil containing a predetermined pattern therein, corresponding to the gasket configuration, on the mesh sheet, pouring a curable polymer (preferably a silicone rubber) through the pattern in the master stencil into mesh sheet, removing the master stencil and pressing the polymer into the mesh. The polymer is then cured and the separator die cut to produce the outside edge and the required holes.

An important feature of the invention concerns the formation of a pattern in the mask or stencil by means of a plurality of holes arranged in the desired configuration, in contrast to merely cutting the pattern out to produce a completely open area. This technique enables one to reduce the amount of polymer left over during the filling or pouring step and hence to combat the tendency of the polymer to redistribute into areas outside of the desired pattern when the polymer is forced into the pores of the mesh.

The mesh is advantageously laid out on a rigid backing sheet and a similar cover sheet placed on top of the mesh after the mask or stencil has been removed, i.e., prior to the pressing step, to aid in providing the required gasket thickness. The cover and backing sheets are in place during the curing step wherein the separator sandwich formed by the mesh and the cover and backing sheets is placed in a pile with other such sandwiches and compressed during curing.

3

Other features and advantages of the invention will be set forth in or apparent from the detailed description of the preferred embodiments found hereinbelow.

DESCRIPTION OF THE PREFERRED EMBODIMENTS

Figure 1:
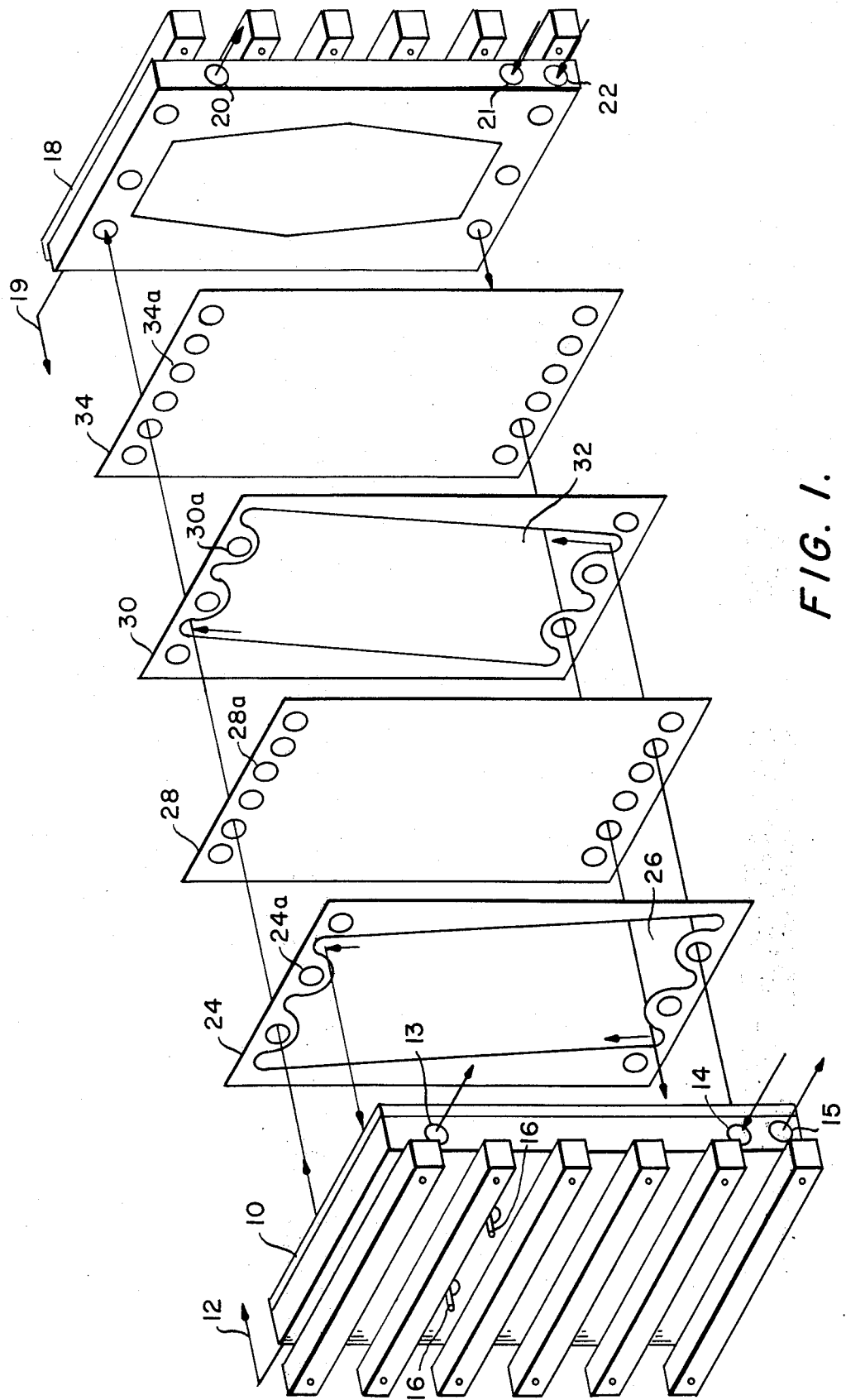
FIG. 1 is an exploded perspective view of a forced flow electrodesalination system incorporating separators constructed in accordance with the invention.

Referring to FIG. 1, there is shown an exploded perspective view of the membranes and gasket-spacers or separators of an experimental forced flow electrodesalination system. As set forth above, the present invention is concerned with a method of manufacturing thin cell separators and FIG. 1 will be considered only to the extent necessary to provide a brief background for the invention. The system of FIG. 1 includes a cathode 10 including an enriching solution exit indicated by arrow 12, a catholyte exit 13, a catholyte inlet 14, a depleting solution inlet 15, and cathode connections 16. An anode 18 includes a depleting solution indicated by arrow 19, an anolyte exit 20, an anolyte inlet 21, and an enriching solution inlet 22. Between cathode 10 and anode 18 is a first gasket-separator 24 which defines an enriching compartment 26, a cation-exchange membrane 28, a second gasket-separator 30 which defines a depleting compartment 32, and an anion-exchange membrane 34. The cation-exchange membrane 28 and the anion-exchange membrane 34, each include a series of apertures 28a and 34a, respectively, arranged along the top and bottom which permit the passage of fluids. Separators 24 and 30 include similar apertures 24a and 30a, respectively, as well as extensions of their respective compartments which register with other apertures of the membranes 28 and 34, as illustrated. The arrows in FIG. 1 indicate the paths and directions of flow of the various fluids through the stack.

Figure 2:
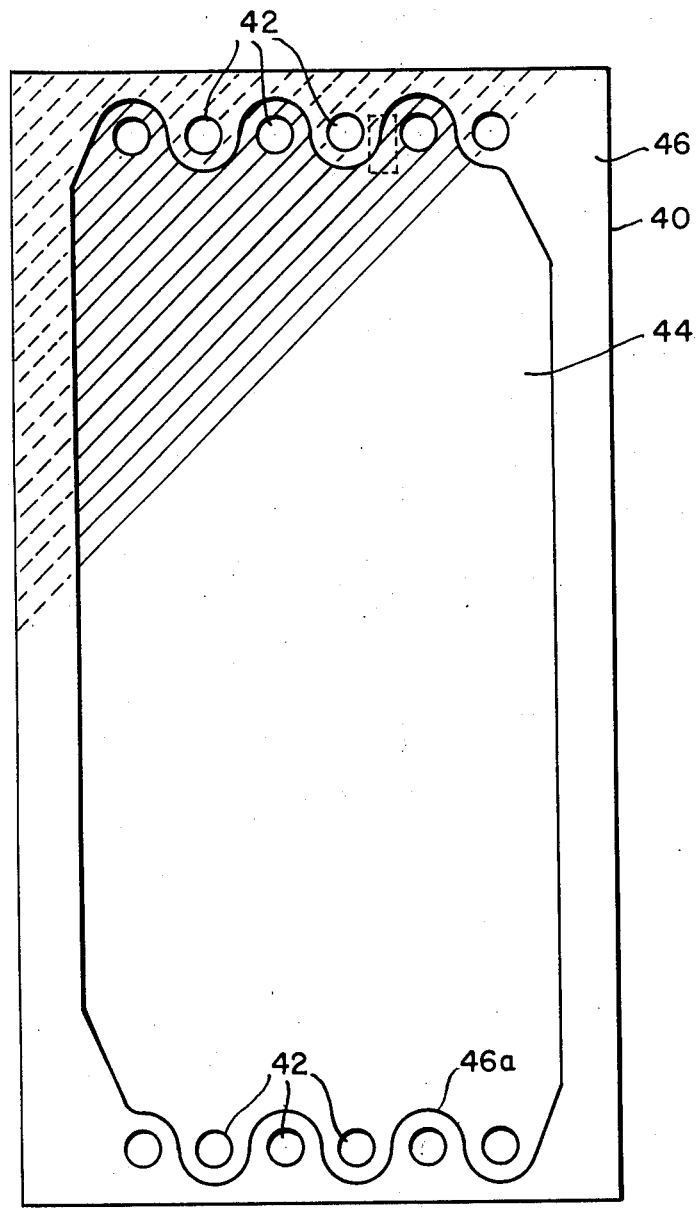
FIG. 2 is a front elevational view of a thin cell separator corresponding to those shown in FIG. 1.

Referring to FIG. 2, a thin cell gasket-spacer or separator corresponding to separators 24 and 30 of FIG. 1 is shown. The separator, which is generally denoted 40, includes a plurality of manifold holes or apertures 42, a plastic mesh 44, which, as is set forth below, can be fabricated of Vexar or the like, and a gasket 46 formed by polymeric material located in the void spaces in mesh 44 and which is arranged in the pattern shown. As illustrated, the outline configuration of gasket 46 is of a complex shape including a plurality of fingers or extensions 46a which extend inwardly from the edge so as to leave alternate ones of the apertures 42 free of the polymeric material.

The method of the invention preferably utilizes a bottom lighted table which is used for the separator pattern transfer, polymer material roll-out and separator inspection steps discussed below. The only other major piece of equipment is a silk screen frame hold which mounts the master stencil or mask and is, in turn, mounted on a counter-balanced swing arm mechanism (not shown).

Turning now to a consideration of the separator fabricating method itself, a rigid backing sheet, preferably of natural polyethylene, is placed on top of the bottom-lighted fabrication table referred to above. It is important that this sheet be smooth and free of wrinkles. Next, a piece of rough plastic mesh is then placed on top of the polyethylene sheet on the assembly table. This mesh used is preferably a polypropylene mesh of the Dupont "Vexar" series. Again, this mesh must be carefully flattened down to avoid ripples or wrinkles and then clamped into place on the table to prevent movement.

Figure 3:
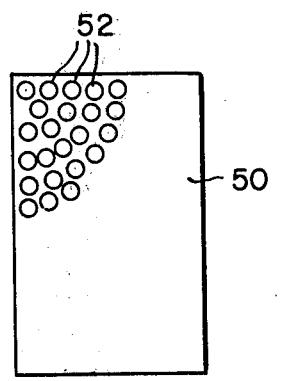
FIG. 3 is a detail of a mask used in the method of the invention, the portion of the mask shown in FIG. 3 corresponding to the portion of the separator shown within the dashed line rectangle in FIG. 2.

A master stencil or mask, constructed of stainless steel, or another suitably durable, hard material, is lowered onto the assembly table, directly against the plastic mesh. The master stencil contains a pattern of holes therein corresponding to the configuration of the gasket shown in FIG. 2. Thus, referring to FIG. 3, the portion of the master stencil illustrated corresponds to the portion of FIG. 2 shown in the dashed line rectangle and, as illustrated, includes a solid area 50 corresponding to the open mesh area of the separator and a pattern of holes 52 corresponding to the gasket area. Clamps again are used to provide close contact between the stencil and the mesh.

A polymeric material (preferably a silicone rubber such as Dow Corning's "Sylgard 170", viscosity modified with Cabolis M-5) is poured into the hole pattern in the stainless steel master stencil. This material is then spread with a rubber edged blade or spatula to completely fill the desired pattern and press the material into the plastic mesh.

The master stencil is next raised or removed and a preliminary inspection of the sheet is made to ensure adequate filling of the mesh. Small portions of polymeric material can be added to fill in depressions in the mesh if necessary.

A second, cover sheet of polyethylene is then placed on top of the partially finished separator. A roller is applied to the top of the cover sheet and is used to press the polymeric material into the plastic mesh and to reduce the thickness of the polymeric material to approximately equal to that of the mesh itself.

The semi-finished separator, with the cover and backing sheets on either side, is then removed from the table and transferred to a pile between a pair of aluminum sheets. Pressure is applied to the pile while curing is taking place. The polymeric material is permitted to cure under pressure for approximately 24 hours.

The semi-finished separator is taken from the file and the polyethylene sheets stripped therefrom. The separator is then die cut to the desired size and shape using standard die-cutting procedures.

An important aspect of the invention concerns the master stencil or mask which includes a hole pattern therein corresponding to the shape of the gasket. The mask is preferably formed by photoetching the desired pattern onto thin mtal sheets or foil. This process involves coating a metal foil with a light sensitive, acid resistant polymer. After the coating dries, a glass plate with a positive image dot pattern is placed on the coated foil in semi-darkness. As explained above in connection with FIG. 3, the outline configuration of the dot pattern on the glass plate corresponds to the pattern that is desired for the gasket area of the separator. The coated metal sheet with the glass plate thereon is exposed to light of a sufficient intensity and wave length to cure the portions of the polymer coating upon which the light impinges. The light does not strike the portions of the polymer layer which are in contact with the dots and, hence these portions are not cured, thereby resulting in a pattern of uncured "dots" in the polymer layer. The coated foil is then washed with a solvent that removes the uncured polymer while leaving the cured polymer intact on the metal foil. The metal foil is thus exposed at the locations of the "dots" and hence, when the sheet is etched with acid, the desired hole pattern is produced therein. As a final step, the cured polymer coating is removed.

It will be evident from the foregoing that the mask formed comprises a solid central area which prevents the passage of the curable plastic and a surrounding peripheral area comprising what might be termed a metal "screen" which is formed in the shape of the gasket. As noted above, the curable polymer is forced through the screen portion into the plastic mesh in the shape of the gasket. This technique differs from "silk screening" techniques, such as are usually used to reproduce fine lines, in that, inter alia, the holes in the metal screen are larger than those employed in a silk screen, and the metal screen holes are spaced farther apart. These differences are due to the need to force relatively large quanities of curable material through the screen into the mesh.

A metal "screen" is used in conjunction with the solid masking central portion of the mask, rather than simply using a solid masking central portion for blocking the inside of the separator, in that this technique minimizes the amount of excess curable polymer which must be removed from the plastic mesh. Thus, considering a practical example, if a mask of the type having only a solid blocking central portion were used and this mask had a thickness of 0.01 inch, the mask would leave 0.01 inches of excess curable polymer on the mesh beyond the outside edges of the solid blocking center. On the other hand, with a mask utilizing a screen such as described above, and the screen including a 30% open area, the excess material that must be removed is only $0.30 \times 0.01 = 0.003$ inches.

It should be noted that the step in which the plastic-filled mesh is pressed with a roller is very important because the peripheral gaskets function most effectively if the thickness of the gaskets is approximately equal to that of the unfilled separator mesh. If the gaskets are thicker than the mesh, intercompartmental leakage (leakage at the manifold holes) and a decrease in achievable limiting current density results. If the gaskets are too thin, on the other hand, a rough, poorly sealing surface is produced so that leakage to the outside can occur.

Although the invention has been described with respect to exemplary embodiments thereof, it will be understood by those skilled in the art that variations and modifications can be effected in these embodiments without departing from the scope and spirit of the invention.

I claim:

1. A method of manufacturing separators comprising a flow through mesh portion and an integral sealing gasket, said method comprising
   a. laying out a mesh sheet,
   b. placing a master stencil containing a predetermined pattern thereon on top of said mesh sheet,
   c. fixing the position of said master stencil with respect to said mesh sheet,
   d. pouring a curable polymer through the pattern in said master stencil,
   e. spreading the polymer so as to completely fill the pattern,
   f. removing said master stencil,
   g. pressing the polymer into the mesh, and
   h. curing the polymer.

2. A method as claimed in claim 1 wherein said laying out step further comprises laying out said mesh sheet on a rigid backing sheet, smoothing out the mesh sheet to eliminate wrinkles therein and clamping said mesh sheet into place on the backing sheet.

3. A method as claimed in claim 1 wherein said pressing step further comprises placing a rigid cover sheet on top of said mesh sheet after said master stencil has been removed and using a roller applied against said cover sheet to press said polymer into said mesh such that the thickness of the separator is substantially equal to the thickness of the mesh sheet.

4. A method as claimed in claim 1 wherein said mesh sheet is laid out on a rigid backing sheet prior to the placement on the master stencil thereon and a cover sheet is placed over the mesh sheet after the removal of the master stencil and prior to said pressing step, said sheets being in place during said curing step and being stripped from said mesh sheet subsequent to said curing step.

5. A method as claimed in claim 4 further comprising die cutting the mesh sheet to outside dimensions of said separator.

6. A method as claimed in claim 5 further comprising die cutting a plurality of holes along the upper and lower edges of said mesh sheet subsequent to said curing step to produce an electrodialysis gasket-separator.

7. A method as claimed in claim 2 wherein said fixing step comprises clamping said mster stencil to said mesh sheet and backing sheet and said method further comprises adding further polymer as necessary after said master stencil is removed.

8. A method as claimed in claim 4 wherein curing step includes placing the separator sandwich comprising said mesh sheet and said associated backing and cover sheets between a pair of metal sheets in a pile of similar separator sandwiches and applying pressure to said pile.

9. A method as claimed in claim 8 wherein said cover and backing sheets comprises polyethylene sheets, said mesh sheet comprises a polypropylene sheet, said polymer comprises a silicone rubber compound, and said master stencil comprises stainless steel.

10. A method as claimed in claim 1 wherein said master stencil is formed by providing a plurality of holes therein arranged in a configuration conforming with said predetermined pattern.

11. A method as claimed in claim 10 wherein the forming of said master stencil includes the steps of coating a metal foil sheet with an light curable acid resistant polymer, placing a plate having a positive image dot pattern on the coated metal foil corresponding to the hole pattern of said predetermined pattern, using electromagnetic radiation to cure the portions of the polymer coating upon which the radiation falls, removing the uncured polymer, etching the portions of the metal foil exposed by removal of the uncured polymer so as to form a plurality of holes in said metal foil corresponding to said dot pattern, and removing the polymer coating.

* * * * *